US010642517B2

(12) United States Patent
Kankani et al.

(10) Patent No.: US 10,642,517 B2
(45) Date of Patent: May 5, 2020

(54) ADJUSTABLE PERFORMANCE PARAMETERS FOR SSDS

(71) Applicant: Western Digital Technologies, Inc., San Jose, CA (US)

(72) Inventors: Navneeth Kankani, San Jose, CA (US); Linh Tien Truong, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 142 days.

(21) Appl. No.: 15/920,422

(22) Filed: Mar. 13, 2018

(65) Prior Publication Data

US 2019/0243567 A1 Aug. 8, 2019

Related U.S. Application Data

(60) Provisional application No. 62/625,913, filed on Feb. 2, 2018.

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC .......... *G06F 3/0632* (2013.01); *G06F 3/0605* (2013.01); *G06F 3/0611* (2013.01); *G06F 3/0653* (2013.01); *G06F 3/0679* (2013.01); *G06F 3/061* (2013.01); *G06F 3/0629* (2013.01); *G06F 3/0634* (2013.01)

(58) Field of Classification Search
CPC ....... G06F 3/0629; G06F 3/0634; G06F 3/061

USPC ........................................................ 711/103
See application file for complete search history.

(56) References Cited

U.S. PATENT DOCUMENTS

| 6,538,669 | B1 | 3/2003 | Lagueux, Jr. et al. |
| 2004/0044509 | A1* | 3/2004 | Demler ............... G06F 17/5036 703/14 |
| 2010/0274953 | A1* | 10/2010 | Lee ........................ G06F 1/266 711/103 |

(Continued)

FOREIGN PATENT DOCUMENTS

WO WO 2014/113066 7/2014

OTHER PUBLICATIONS

International Search Report and Written Opinion from PCT/US2019/013452, dated Apr. 24, 2019, 10 pages.

*Primary Examiner* — Edward J Dudek, Jr.
*Assistant Examiner* — Sidney Li
(74) *Attorney, Agent, or Firm* — Morgan, Lewis & Bockius LLP

(57) ABSTRACT

Disclosed is a system and method for providing host adjustable performance parameters for SSDs. The method includes accessing a latency profile based on a determined device age of a solid state drive (SSD). The method also includes providing for display a user interface comprising a plurality of interface elements to adjust a respective plurality of performance specifications of the SSD, wherein the user interface is configured based on the latency profile. The method also includes receiving, via the user interface, an adjustment to the plurality of performance specifications. The method also includes sending an instruction to the SSD to configure the SSD with a parameter set based on the adjusted plurality of performance specifications.

32 Claims, 6 Drawing Sheets

(56) References Cited

U.S. PATENT DOCUMENTS

| | | |
|---|---|---|
| 2012/0096246 A1 | 4/2012 | Pio |
| 2013/0311709 A1 | 11/2013 | Im et al. |
| 2014/0032834 A1* | 1/2014 | Cudak ................ G06F 11/1092 |
| | | 711/114 |
| 2015/0046664 A1* | 2/2015 | Fitzpatrick ............ G06F 3/0616 |
| | | 711/156 |
| 2017/0336978 A1 | 11/2017 | Fanning et al. |

* cited by examiner

ADJUSTABLE PERFORMANCE PARAMETERS FOR SSDS

CROSS-REFERENCE TO RELATED APPLICATION

This application claims the benefit of U.S. Provisional Application No. 62/625,913, filed Feb. 2, 2018, the entirety of which is incorporated herein by reference.

BACKGROUND

For many applications, a Solid State Drive (SSD) is the storage device of choice due to high random access performance. A SSD can provide low latency service for a large percentage of requests. However, many latency sensitive applications measure against worst-case latency to benchmark application performance. Latency increases of even a few milliseconds can compound into multi-second delays.

SUMMARY

The subject technology provides a method for providing host adjustable performance parameters for SSDs. According to aspects, a method may include accessing a latency profile based on a determined device age of a solid state drive (SSD). The method may also include providing for display a user interface comprising a plurality of interface elements to adjust a respective plurality of performance specifications of the SSD, wherein the user interface is configured based on the latency profile. The method may also include receiving, via the user interface, an adjustment to the plurality of performance specifications. The method may also include sending an instruction to the SSD to configure the SSD with a parameter set based on the adjusted plurality of performance specifications.

In other aspects, a non-transitory machine-readable medium may include machine-executable instructions thereon that, when executed by a computer or machine, perform a method. In this regard, the method may include accessing a latency profile based on a determined device age of a solid state drive (SSD). The method may also include providing for display a user interface comprising a plurality of interface elements to adjust a respective plurality of performance specifications of the SSD, wherein the user interface is configured based on the latency profile. The method may also include receiving, via the user interface, an adjustment to the plurality of performance specifications. The method may also include sending an instruction to the SSD to configure the SSD with a parameter set based on the adjusted plurality of performance specifications.

In further aspects, a system may include a processor and a memory media. The memory media may have instructions stored thereon that, when executed by the processor, cause the processor to access a latency profile based on a determined device age of a solid state drive (SSD). The instructions also cause the processor to provide for display a user interface comprising a plurality of interface elements to adjust a respective plurality of performance specifications of the SSD, wherein the user interface is configured based on the latency profile. The instructions also cause the processor to receive, via the user interface, an adjustment to the plurality of performance specifications. The instructions also cause the processor to send an instruction to the SSD to configure the SSD with a parameter set based on the adjusted plurality of performance specifications.

In further aspects, a system may include means for accessing a latency profile based on a determined device age of a solid state drive (SSD). The system may also include means for providing for display a user interface comprising a plurality of interface elements to adjust a respective plurality of performance specifications of the SSD, wherein the user interface is configured based on the latency profile. The system may also include a means for receiving, via the user interface, an adjustment to the plurality of performance specifications. The system may also include a means for sending an instruction to the SSD to configure the SSD with a parameter set based on the adjusted plurality of performance specifications.

In further aspects, a system may include non-volatile memory and a controller. The controller may be configured to receive an instruction from a host to configure the data storage system with a parameter set based on a plurality of specified performance specifications. The controller may be configured to determine the parameter set that achieves the plurality of performance specifications. The controller may be configured to configure the data storage system based on the parameter set.

In further aspects, a method may include receiving an instruction from a host to configure a solid state drive (SSD) with a parameter set based on a plurality of specified performance specifications. The method may also include determining the parameter set that achieves the plurality of specified performance specifications. The method may also include configuring a data storage system based on the parameter set.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
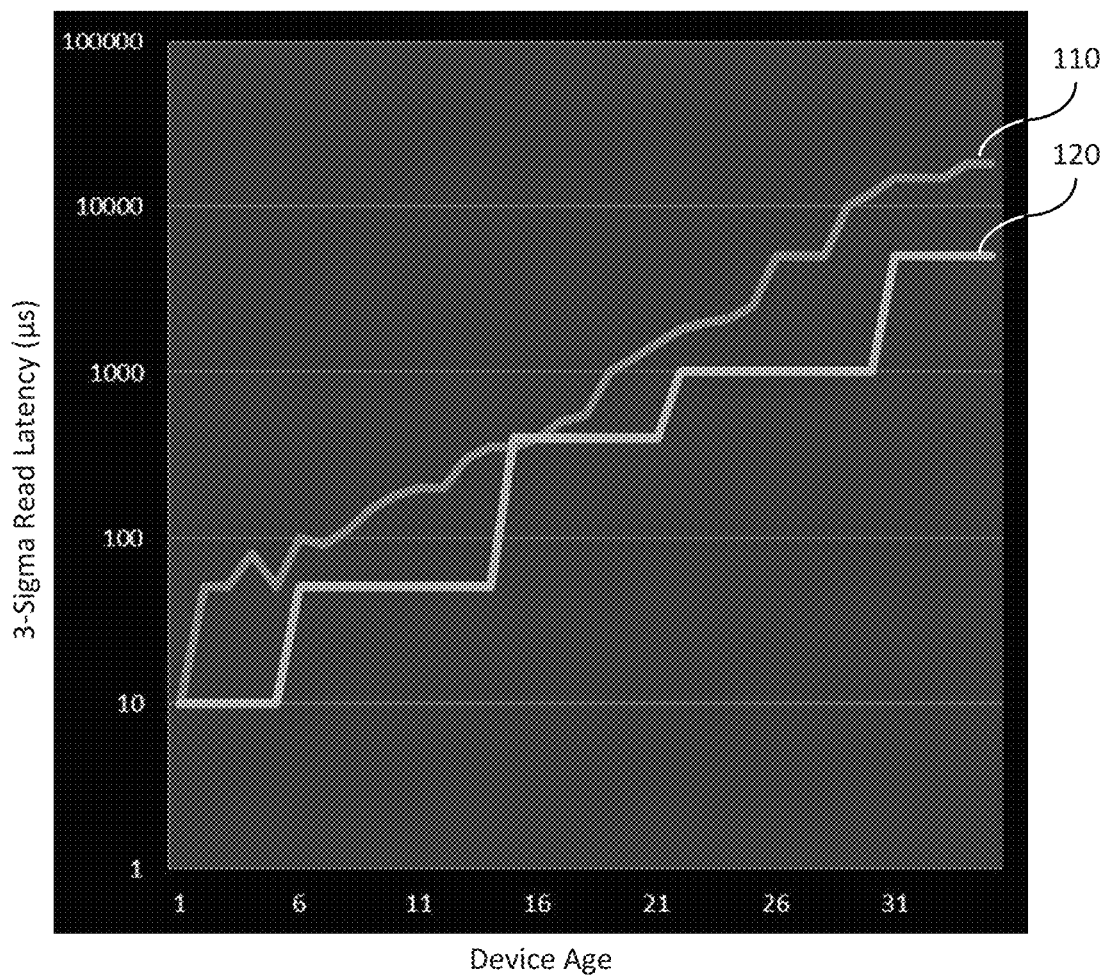
FIG. 1 is a graph diagram illustrating 3-sigma read latency for an exemplary SSD using adjustable performance parameters.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

As SSDs continue to grow in storage density to meet increasing demand for data storage, SSD controller designs have continued to grow in complexity to adapt to the reduced reliability and endurance of multi-level cells (MLC), triple-level cells (TLC), quad-level cells (QLC), and even higher density memory cells. As a result, due to factors such as background bookkeeping processes, error correction, and write/erase collision waits, it is difficult for SSDs to provide strict latency guarantees. Further, since many of these factors also degrade SSD performance over time, latency service levels may also fluctuate considerably over time. These factors make it difficult for SSDs to provide a predictable latency service level to support demanding enterprise applications.

The subject technology addresses unpredictable SSD latency by providing adjustable performance parameters for SSDs. The SSD may be given a target service level in regards to desired latency performance for an application. For example, a target read latency may be provided for a desired read latency distribution, such as meeting a maximum 100 us latency for a 3-sigma distribution of read requests, or for approximately 99.7% of read requests. This may be referred to in shorthand as a 100 us 3-sigma read latency.

In some aspects of the subject technology, a target service level for a SSD may be modified using a user interface. This user interface may also allow the user to adjust various performance specifications of the SSD to meet the target service level, such as but not limited to drive capacity, read latency performance, write performance, and endurance.

Since the SSD controller has intimate knowledge of the operation and performance characteristics of the SSD, the SSD controller may have a latency profile available that includes a number of parameter sets to achieve various latency service levels at different age ranges of the SSD. By selecting a parameter set that satisfies the target service level for a current device age of the SSD, the controller can adjust operation parameters of the SSD using the parameter set to achieve the target service level. As the SSD continues to age, the controller can shift to a different parameter set, if available, to continue servicing the target service level. However, if no parameter set is available for the target service level, then the SSD can be retired or transferred to a different cluster with a compatible latency profile. In alternative aspects of the subject technology, the host may select and communicate the parameter sets for meeting a target service level to the SSD.

To compare the read latency of a SSD with and without using adjustable performance parameters, FIG. 1 is a graph diagram illustrating 3-sigma read latency for an exemplary SSD using adjustable performance parameters. Plot 110 illustrates 3-sigma read latency over device age for a SSD without adjustable performance parameters, whereas plot 120 illustrates 3-sigma read latency over device age for a SSD with adjustable performance parameters. As shown in plot 110, the 3-sigma read latency fluctuates over time.

On the other hand, the 3-sigma read latency in plot 120 remains consistent for a length of time before each step up to a higher 3-sigma read latency. Latency sensitive applications may prefer consistent latency performance to provide reliable service. As shown in plot 120, five distinct device age ranges of a SSD can be provided with flat, predictable 3-sigma read latencies. To provide these flat or stepped read latencies for a SSD, each of the device age ranges may be configured with a particular parameter set according to adjustable performance parameters for the SSD that define performance tradeoffs to achieve the read latency performance requirements for each step in plot 120. While five steps of predictable read latency performance are shown in plot 120, a SSD may be configured with greater or fewer steps.

To achieve the improved stepped latency performance as shown in plot 120, a user may adjust the performance specifications of the SSD to reduce performance in other, lower priority aspects of the SSD. For example, the performance specifications may be adjustable via a user interface on a host. Since the user can decide which particular performance specifications to adjust, the performance tradeoffs to improve read latencies can be made amenable to the user's specific needs and applications.

Figure 2:
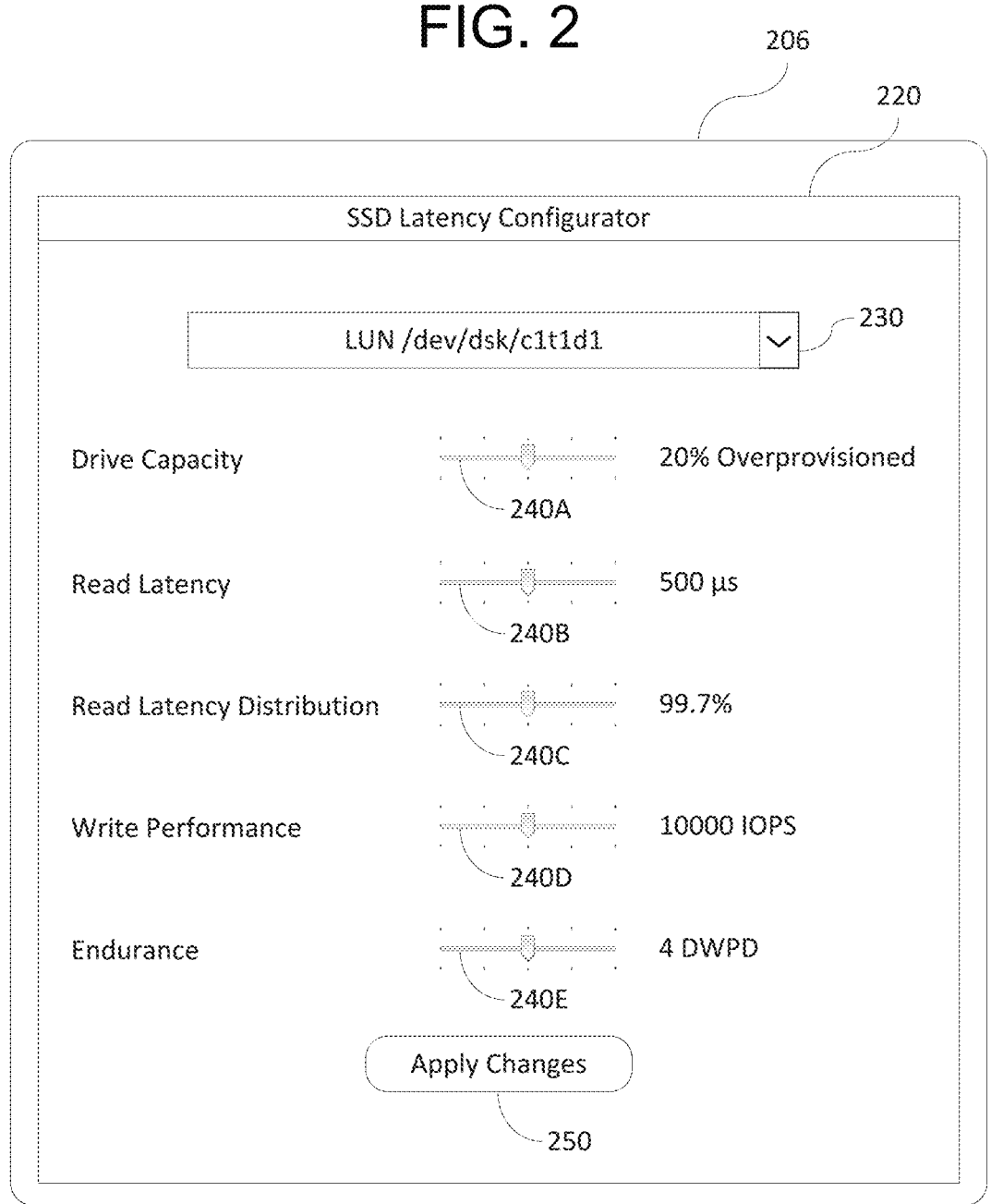
FIG. 2 is a diagram illustrating an example user interface for modifying a target service level for a SSD.

FIG. 2 is a diagram illustrating an example user interface for modifying a target service level for a SSD. Display device 206 includes user interface 220. As shown in user interface 220, drop-down menu 230 may be utilized to select a particular SSD to modify, and user interface elements 240A, 240B, 240C, 240D, and 240E may be used to adjust performance specifications of the SSD. In user interface 220, user interface elements 240A-240E are depicted as slider controls, but any suitable user interface element may be chosen. Further, note that the particular performance specifications shown in user interface elements 240A-240E are only one example, and that other performance specifications may be exposed in user interface 220. Once configuration is completed, button 250 may be used to apply the changes reflected by user input on user interface elements 240A-240E.

User interface elements 240A-240E may be configured based on a latency profile, which may be retrieved from the SSD itself, or from an external source such as a database. Accordingly, the ranges of user interface elements 240A-240E may be limited according to the specifications of the latency profile, which in turn may be accessed based on the device age of the SSD.

As discussed above, the performance specifications may reflect performance tradeoffs to be considered by the user. Thus, adjusting one user interface element may in turn affect one or more other user interface elements. For example, adjusting a first user interface element may limit the adjustment range of a second user interface element, or a second and a third user interface element. When the adjustment range of the second user interface element no longer includes the current value of the second user interface element, the value of the second user interface element may automatically move into the allowed adjustment range. Thus, adjusting a first user interface element may cause a second user interface element to adjust automatically in tandem. In this manner, the user can readily visualize the performance tradeoffs necessary to achieve a desired target service level.

User interface element 240A allows adjustment to the drive capacity or available user space on the SSD. As the drive capacity increases, the amount of space available for overprovisioning decreases. In FIG. 2, user interface element 240A is adjusted to reserve 20% of available drive space for overprovisioning, leaving 80% for user data.

User interface element 240B allows adjustment to read latency, or a target maximum read latency. In FIG. 2, user interface element 240B is adjusted to provide a 500 µs read latency.

User interface element 240C allows adjustment to read latency distribution, or a target distribution for meeting the maximum read latency. In FIG. 2, user interface element 240C is adjusted to provide a 99.7% (3-sigma) distribution of read requests that meet the indicated 500 µs maximum read latency.

User interface element 240D allows adjustment to write performance, or the number of input/outputs per second (IOPS) for writes. In FIG. 2, user interface element 240D is adjusted to provide 10,000 IOPS write performance.

User interface element 240E allows adjustment to endurance, or the number of drive writes per day (DWPD) supported for a defined operational lifetime of the SSD. In FIG. 2, user interface element 240E is adjusted to provide 4 DWPD.

Note that as discussed above, adjusting one slider may affect other sliders. Many of the characteristics indicated by user interface elements 240A-240E represent trade-offs in SSD device performance, and an improvement in one characteristic entails a tradeoff or decrease in another characteristic. For example, in order to improve write performance, more space on the SSD may be reserved for overprovisioning. Thus, if user interface element 240D for write performance is increased, then user interface element 240A for drive capacity may decrease correspondingly.

Further, the particular performance characteristics of the SSD may place bounds on the ranges available for user interface elements 240A-240E. Accordingly, user interface elements 240A-240E may be bounded according to constraints of a latency profile for the SSD selected in drop-down menu 230. Additionally, these constraints are not static and are affected by device aging of the SSD. Thus, the constraints may vary or become stricter as the SSD continues to age.

After button 250 is engaged, the characteristics reflected by user interface elements 240A-240E may be saved into a target service level data structure, which may be transmitted as an instruction to the SSD indicated in drop-down menu 230 for reconfiguration according to a parameter set indicated by the target service level data structure. In some cases, this reconfiguring may move or reconfigure data. If user interface elements 240B and 240C are adjusted, then SSD parameters for read, write, and erase operations may be configured according to a parameter set provided by the host or selected by the SSD.

Further, while FIG. 2 illustrates an interactive user interface for setting the parameters of the target service level, alternative aspects of the present technology may provide interfaces such as an application program interface (API), a command-line interface (CLI), a device driver, a script, a proprietary executable, or other methods to set, adjust, and query the target service level.

Figure 3:
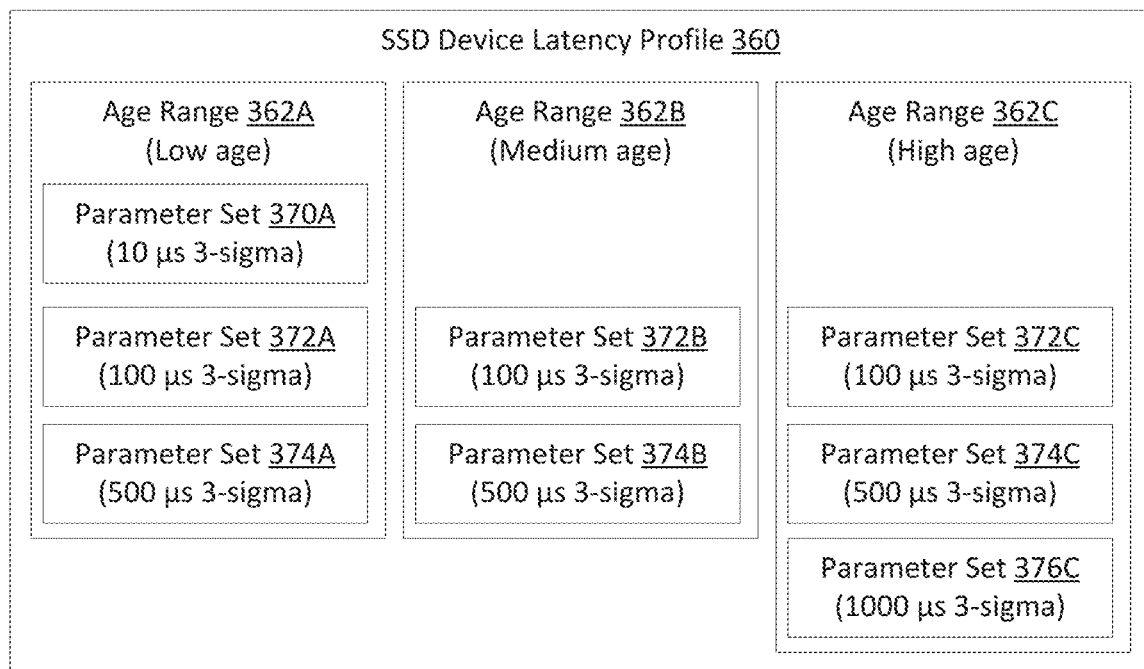
FIG. 3 is a diagram illustrating an example SSD latency profile.

FIG. 3 is a diagram illustrating an example SSD latency profile. SSD device latency profile 360 includes age ranges 362A, 362B, and 362C. Age range 362A includes parameter set 370A, parameter set 372A, and parameter set 374A. Age range 362B includes parameter set 372B and parameter set 374B. Age range 362C includes parameter set 372C, parameter set 374C, and parameter set 376C.

As shown in SSD device latency profile 360, a number of age ranges 362A-362C are defined, each containing a number of parameter sets for meeting read latency targets. Note that SSD device latency profile 360 includes three age ranges, which enables three steps of predictable read latency performance as the SSD ages from low to medium to high age. Of course, SSD device latency profile 360 may include any number of age ranges and corresponding parameter sets. Age ranges 362A-362C may define age ranges for comparing to a device age of the SSD determined from statistics logged and updated by the SSD controller, such as the program/erase (P/E) cycle count for non-volatile memory contained in the SSD.

For example, consider age range 362A, which is defined for a low age range of the SSD. Since the SSD is still early in its lifecycle, the SSD can perform at a high performance level, enabling parameter set 370A to be included as a selectable parameter set within age range 362A of SSD device latency profile 360. When the SSD is configured with parameter set 370A, the SSD can provide read performance with a low 10 µs 3-sigma read latency, which may correspond to the first step of plot 120 shown in FIG. 1. However, to achieve this low latency, parameter set 370A may define a number of parameters to be configured for the SSD, which can represent performance tradeoffs for read, write, and erase operations. These potential tradeoffs are described below in conjunction with Tables 1 and 2.

If the tradeoffs for parameter set 370A are not acceptable to the user, then the user can instead indicate a 100 µs or 500 µs 3-sigma read latency performance specification, for example by adjusting user interface elements 240B-240C in FIG. 2. Parameter set 372A (for 100 µs 3-sigma read latency) may allow non read-latency SSD performance specifications to be adjusted with a wider range compared to parameter set 370A, and parameter set 374A (for 500 µs 3-sigma read latency) may allow non read-latency SSD performance specifications to be adjusted with even a wider range compared to parameter set 370A. In this manner, the user can specify priorities for SSD performance depending on latency and other performance requirements of the user's applications or use cases.

Recall that the user may specify performance specifications or a target service level according to the latency profile of a particular SSD. As the SSD ages, the host or the SSD may be unable to select a parameter set that meets the performance specifications of the specified target service level. In this case, the SSD may transfer to a different cluster where the SSD can still select an acceptable parameter set according to a new latency profile, such as a profile defined for applications with higher latency tolerances. If no such cluster is available, then the SSD may be retired.

Before discussing some examples for the parameter sets in FIG. 3, it may be helpful to establish a number of example parameters, or a parameter matrix, that can be selected to populate the parameter sets in a latency profile. An example parameter matrix is listed below in Table 1:

TABLE 1

Exemplary parameter matrix.

| Parameter | State(s) | Description | Advantage |
|---|---|---|---|
| Fast read | Enable | Reduce read sense time | Read latency |
| Fast read | Disable | Normal read sense time | Read reliability |
| Suspend Write/Erase | Write and/or Erase | Enable suspending of write and/or erase operations for read operations | Read latency |
| Suspend Write/Erase | Disable | Wait until write and erase operations are complete | Write performance |
| Pre-emptive slow read | Enable | Perform multiple read methods | Read reliability |
| Pre-emptive slow read | Disable | Perform standard read | Read latency |
| Erase abort | Enable | Abort erase operations for write collisions | Write performance |
| Erase abort | Disable | Wait on write collisions | Drive endurance |
| Read retry table | Priority, Neighbor, Full | Perform multiple read retries on error | Read reliability |
| Read retry table | Disable | Abort on read error | Read latency |
| Write mirroring | Enable | Write data mirrored in parallel | Read latency, read reliability |
| Write mirroring | Disable | Write single copy of data | Drive capacity |
| Frame recovery | Enable | Enforce time limit for total error recovery time | Read latency |
| Frame recovery | Disable | No time limit for total error recovery time | Read reliability |
| Maximum read recovery before reporting failure | High value | Long error recovery before reporting failure | Read reliability |
| Maximum read recovery before reporting failure | Low value | Short error recovery before reporting failure | Read latency |

As shown in Table 1, each parameter may represent a tradeoff in terms of performance, reliability, drive capacity, drive endurance, or other performance characteristics of the SSD. By fine-tuning the parameters in a specific way, a target service level may be provided while minimizing impact to other operational aspects of the SSD. Particular parameters may also be prioritized, as illustrated in user interface 220 of FIG. 2. These tunings may be represented in the parameter sets illustrated in FIG. 3.

Example parameter sets for SSD device latency profile 360 are illustrated below in Table 2. Please note that these are only illustrative and other parameter sets may be used.

TABLE 2

Exemplary parameter sets for SSD device latency profile 360.

| Age | Maximum Read Latency 3-sigma | Parameter | State |
|---|---|---|---|
| Low (Age Range 362A) | 10 μs (Parameter Set 370A) | Fast read | Enable |
| | | Write mirroring | Enable |
| | | Erase abort | Enable |
| | | Read retry table | Disable |
| | 100 μs (Parameter Set 372A) | Fast read | Disable |
| | | Suspend Write/Erase | Write & Erase |
| | | Read retry table | Priority |
| | 500 μs (Parameter Set 374A) | Pre-emptive slow read | Enable |
| | | Read retry table | Full |
| | | Frame recovery | Enable |
| Medium (Age Range 362B) | 10 μs | N/A | |
| | 100 μs (Parameter Set 372B) | Fast read | Disable |
| | | Write mirroring | Enable |
| | | Suspend Write/Erase | Erase |
| | 500 μs (Parameter Set 374B) | Pre-emptive slow read | Enable |
| | | Suspend Write/Erase | Write & Erase |
| | | Read retry table | Priority & Neighbor |
| High (Age Range 362C) | 10 μs | N/A | |
| | 100 μs (parameter Set 372C) | Pre-emptive slow read | Enable |
| | | Write mirroring | Enable |
| | | Erase abort | Enable |
| | | Read retry table | Disable |

TABLE 2-continued

Exemplary parameter sets for SSD device latency profile 360.

| Age | Maximum Read Latency 3-sigma | Parameter | State |
|---|---|---|---|
| | 500 μs (Parameter Set 374C) | Pre-emptive slow read | Enable |
| | | Read retry table | Priority & Neighbor |
| | | Suspend Write/Erase | Write & Erase |
| | 1000 μs (Parameter Set 376C) | Pre-emptive slow read | Enable |
| | | Read retry table | Full |

For example, consider the case of medium age, or age range 362B. In this case, the SSD has already aged enough that the 10 μs latency target is no longer feasible, and thus a parameter set for the 10 μs latency target is not present. For the 100 μs target, or parameter set 372B, the parameters are chosen from the parameter matrix in Table 1 to meet the 100 μs target while taking into consideration the medium age of the SSD. For example, fast read is disabled since at medium age, error correction becomes more important and fast read may lead to high error rates. Write mirroring is enabled to provide lower read latency and higher read reliability at the cost of reduced drive capacity. Finally, suspend write/erase is applied for erases only to improve read latency while preserving write performance.

Thus, to meet the 100 μs latency target when the SSD device age falls into age range 362B or medium age, the SSD can be reconfigured with parameter set 372B. When the SSD receives a read operation, a normal read occurs. When the SSD receives a write operation, a mirrored write occurs across multiple mirrors instead of a single copy. When the SSD receives an erase command, the erase command may suspend for a predefined time to help prioritize read operations. While parameter set 372B affects read, write, and erase operations, a parameter set may affect any number of SSD device operations. The parameter set 372B may be provided directly by the host when instructing the SSD to reconfigure, or the host may instruct the SSD to select a parameter set meeting the performance specifications of a target service level, and the SSD may accordingly select parameter set 372B from a metadata area of the SSD storing SSD device latency profile 360.

Figure 4A:
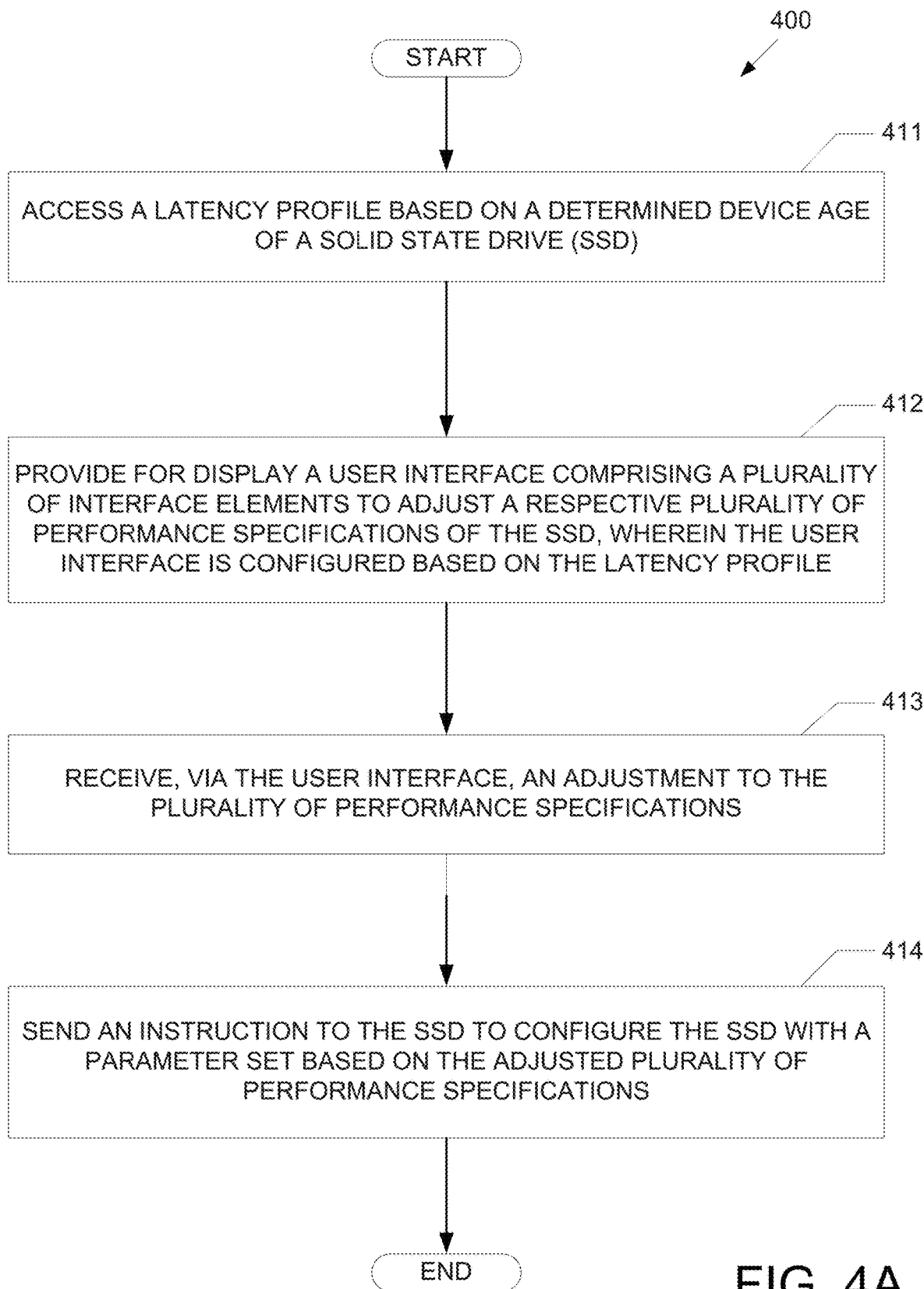
FIG. 4A is a flowchart illustrating an example process for providing host adjustable performance parameters for SSDs.

FIG. 4A is a flowchart illustrating an example process 400 for providing host adjustable performance parameters in SSDs. One or more blocks of FIG. 4A may be executed by a computing system (including, e.g., a data storage controller of an SSD, processor, or the like). Similarly, a non-transitory machine-readable medium may include machine-executable instructions thereon that, when executed by a computer or machine, perform the blocks of FIG. 4A.

Figure 5:
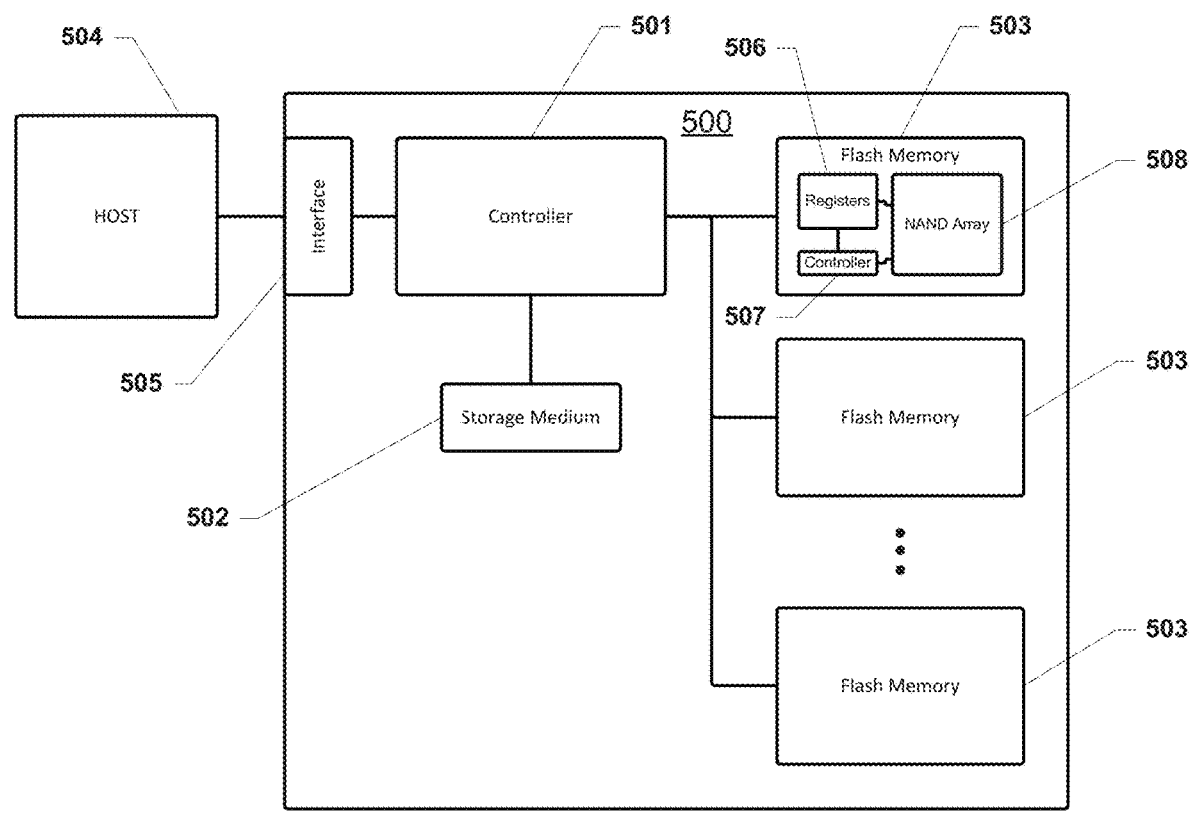
FIG. 5 is a block diagram illustrating components of an example data storage system.

In block 411, referring to FIG. 3 and FIG. 5, host 504 accesses SSD device latency profile 360 based on a determined device age of data storage system 500. For example, P/E cycles for NAND array 508 may be used to determine the device age of data storage system 500. Of course, other criteria may be used as well. The device age may be stored and maintained in a log or metadata area of data storage system 500, such as storage medium 502. Based on the determined device age, SSD device latency profile 360 may be accessed, for example from storage medium 502, from host 504, or from an external data source. For example, when host 504 determines that the device age falls within one of age ranges 362A-362C, then SSD device latency profile 360 may be accessed.

In block 412, referring to FIG. 2 and FIG. 5, host 504 provides for display, on display device 206, user interface 220 comprising user interface elements 240A-240E to adjust a respective plurality of performance specifications of data storage system 500, wherein user interface 220 is configured based on SSD device latency profile 360 from block 411. As discussed above, the configuring of user interface 220 may include defining valid ranges and performance tradeoffs of user interface elements 240A-240E. More generally, relationships may be defined wherein improving a first performance specification causes a reduction in a second performance specification. For example, adjusting the first performance specification may result in limiting a valid range of the second performance specification. When the second performance specification is no longer within the valid range, host 504 may automatically adjust the second performance specification to remain within the valid range. Accordingly, user interface elements 240A-240E may appear linked and move in tandem. The user can adjust user interface elements 240A-240E according to the user's performance priorities or host application requirements.

In block 413, referring to FIG. 2 and FIG. 5, host 504 receives, via user interface 220, an adjustment to the plurality of performance specifications associated with respective user interface elements 240A-240E. For example, a user may use an input device to adjust the sliders of user interface elements 240A-240E according to the user's performance priorities and read latency requirements.

In block 414, referring to FIG. 5, host 504 sends an instruction to data storage system 500 to configure data storage system 500 with a parameter set based on the adjusted plurality of performance specifications received from block 413. For example, referring to FIG. 2 and FIG. 3, assume the plurality of performance specifications includes a 500 us 3-sigma read latency as indicated by user interface elements 240B and 240C, and assume the device age from block 411 corresponds to medium age. In this example, the parameter set corresponds to parameter set 374B from SSD device latency profile 360. Thus, host 504 sends an instruction to data storage system 500 to configure data storage system 500 with parameter set 374B. As discussed above, host 504 may directly provide parameter set 374B to data storage system 500, or host 504 may provide the target service level and allow data storage system 500 to select parameter set 374B accordingly. In either case, host 504 causes data storage system 500 to configure itself to enable pre-emptive slow read, enable suspend write and erase, and use priority and neighbor tables for read retry, as indicated in Table 2 above.

Figure 4B:
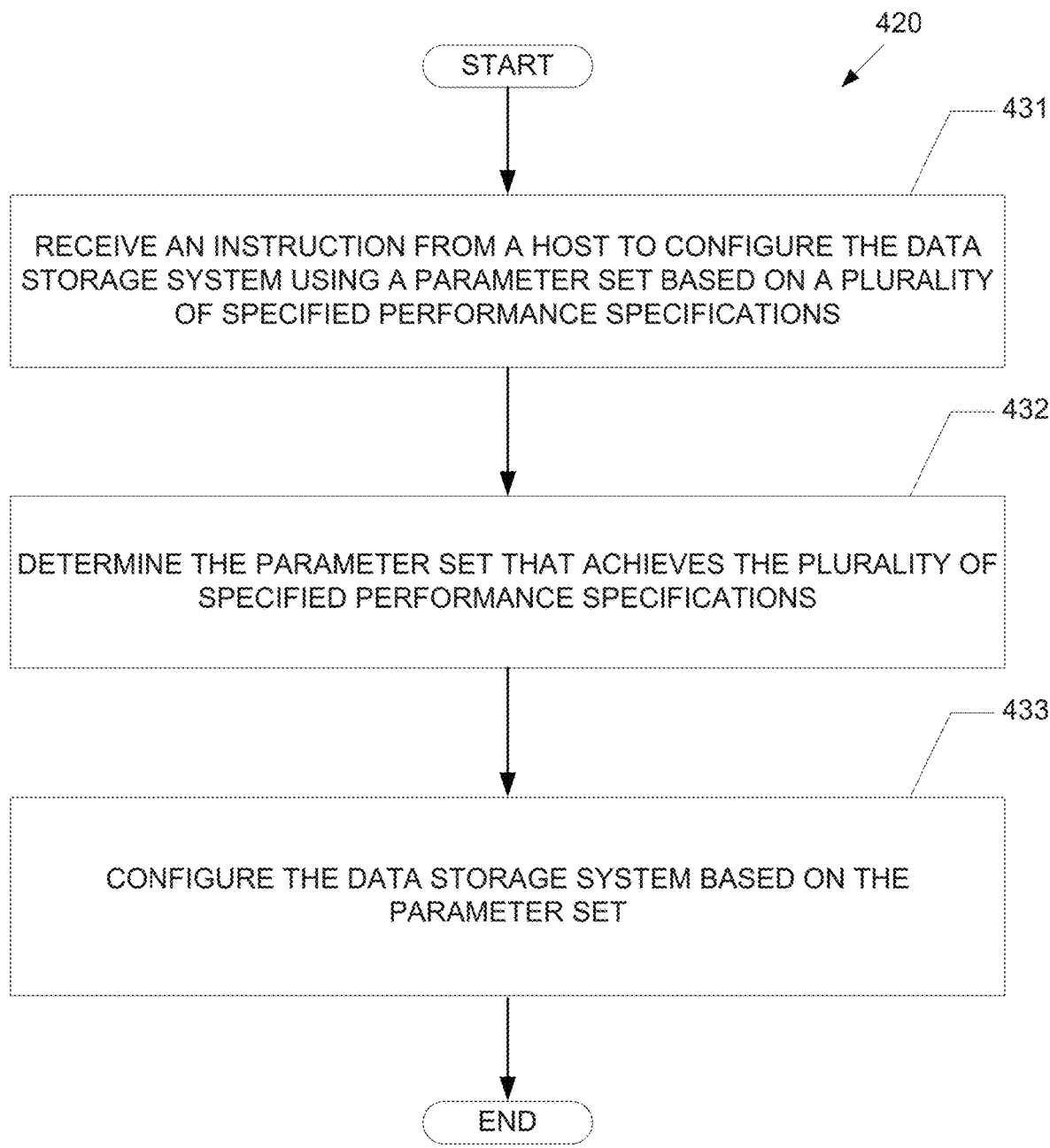
FIG. 4B is a flowchart illustrating an example process for configuring a SSD with host adjustable performance parameters.

FIG. 4B is a flowchart illustrating an example process 420 for configuring a SSD with host adjustable performance parameters, according to aspects of the subject technology. One or more blocks of FIG. 4B may be executed by a computing system (including, e.g., a data storage controller of an SSD, processor, or the like). Similarly, a non-transitory machine-readable medium may include machine-executable instructions thereon that, when executed by a computer or machine, perform the blocks of FIG. 4B.

In block 431, referring to FIG. 5, data storage system 500 receives an instruction from host 504 to configure data storage system 500 using a parameter set based on a plurality of specified performance specifications. The instruction may be similar to the instruction provided in process 400 described above with FIG. 4A.

In block 432, referring to FIG. 3 and FIG. 5, data storage system 500 determines the parameter set that achieves the specified plurality of performance specifications from block 431. As discussed above, host 504 may directly provide the parameter set with the instruction from block 431. Alternatively, host 504 may only provide a target service level. As discussed above, the target service level may include a read distribution for a maximum read latency, or a 3-sigma read latency. Based on a determined device age of data storage system 500 and the target service level received from block 432, the matching parameter set may be determined from SSD device latency profile 360.

For example, if the target service level specifies a 100 µs 3-sigma read latency and the device age of data storage system 500 is determined to fall within age range 362A or low age, then data storage system 500 may determine that parameter set 372A achieves the target service level, including the specified 100 µs 3-sigma read latency. While parameter set 370A may appear to be a potential candidate since parameter set 370A provides a 10 µs 3-sigma read latency meeting the 100 µs 3-sigma read latency requirement, parameter set 370A may still fail to achieve other performance specifications defined in the target service level. For example, when the user defined the target service level, user interface 220 may have been configured such that the adjustment ranges for the performance specifications were consistent with wider ranges defined by parameter set 372A, rather than narrower ranges defined by parameter set 370A. Thus, only parameter set 372A may achieve the performance specifications defined by the target service level.

In block 433, referring to FIG. 5, data storage system 500 configures data storage system 500 based on the parameter set from block 432. As shown above in Table 2, this can include settings for read, write, and erase operations. Assuming that parameter set 372A is determined from block 432, data storage system 500 may be configured with fast reads disabled, suspend writes and erases, and priority read retry tables only. When data storage system 500 receives requests for read, write, and erase operations, the operations may operate according to the configured parameters. For example, read operations may use normal reads and use priority read retry tables for read errors. Write operations may suspend to prioritize read operations. Erase operations may suspend to prioritize read operations.

FIG. 5 is a block diagram illustrating components of an example data storage system, according to aspects of the subject technology. As depicted in FIG. 5, in some aspects, data storage system 500 (e.g., a solid state drive) includes data storage controller 501, storage medium 502, and flash memory 503. Controller 501 may use storage medium 502 for temporary storage of data and information used to manage data storage system 500. Controller 501 may include several internal components (not shown) such as a read-only memory, a flash component interface (e.g., a multiplexer to manage instruction and data transport along a serial connection to flash memory 503), an I/O interface, error correction circuitry, and the like. In some aspects, all of these elements of controller 501 may be integrated into a single chip. In other aspects, these elements may be separated on their own PC board.

In some implementations, aspects of the subject disclosure may be implemented in data storage system 500. For example, aspects of the subject disclosure may be integrated with the function of data storage controller 501 or may be implemented as separate components for use in conjunction with data storage controller 501.

Controller 501 may also include a processor that may be configured to execute code or instructions to perform the operations and functionality described herein, manage request flow and address mappings, and to perform calculations and generate commands. The processor of controller 501 may be configured to monitor and/or control the operation of the components in data storage controller 501. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on ROM within controller 501 and/or its processor. One or more sequences of instructions may be software stored and read from storage medium 502, flash memory 503, or received from host device 504 (e.g., via host interface 505). ROM, storage medium 502, flash memory 503, represent examples of machine or computer readable media on which instructions/code executable by controller 501 and/or its processor may be stored. Machine or computer readable media may generally refer to any medium or media used to provide instructions to controller 501 and/or its processor, including volatile media, such as dynamic memory used for storage media 502 or for buffers within controller 501, and non-volatile media, such as electronic media, optical media, and magnetic media.

In some aspects, controller 501 may be configured to store data received from a host device 504 in flash memory 503 in response to a write command from host device 504. Controller 501 is further configured to read data stored in flash memory 503 and to transfer the read data to host device 504 in response to a read command from host device 504. As will be described in more detail below, controller 501 is also configured to predict when current read levels and/or settings are suspect and to estimate new read levels when it is predicted that the current read levels and/or settings need to be changed. If the estimated read levels are proven to be insufficient, controller 501 may be configured to perform further iterative adjustments to correct the read level parameters. By dynamically adjusting read levels of the memory 503, the subject technology may extend the number of program/erase operations that may be performed on memory cells within flash memory 503 in a particular application environment, and increase the endurance of the memory cells compared to the same application environment operating without the ability to dynamically adjust read levels.

Host device 504 represents any device configured to be coupled to data storage system 500 and to store data in data storage system 500. Host device 504 may be a computing system such as a personal computer, a server, a workstation, a laptop computer, PDA, smart phone, and the like. Alternatively, host device 504 may be an electronic device such as a digital camera, a digital audio player, a digital video recorder, and the like.

In some aspects, storage medium 502 represents volatile memory used to temporarily store data and information used to manage data storage system 500. According to aspects of the subject technology, storage medium 502 is random access memory (RAM) such as double data rate (DDR) RAM. Other types of RAM also may be used to implement storage medium 502. Memory 502 may be implemented using a single RAM module or multiple RAM modules. While storage medium 502 is depicted as being distinct from controller 501, those skilled in the art will recognize that storage medium 502 may be incorporated into controller 501 without departing from the scope of the subject technology. Alternatively, storage medium 502 may be a non-volatile memory such as a magnetic disk, flash memory, peripheral SSD, and the like.

As further depicted in FIG. 5, data storage system 500 may also include host interface 505. Host interface 505 may be configured to be operably coupled (e.g., by wired or wireless connection) to host device 504, to receive data from host device 504 and to send data to host device 504. Host interface 505 may include electrical and physical connections, or a wireless connection, for operably coupling host device 504 to controller 501 (e.g., via the I/O interface of controller 501). Host interface 505 may be configured to communicate data, addresses, and control signals between host device 504 and controller 501. Alternatively, the I/O interface of controller 501 may include and/or be combined with host interface 505. Host interface 505 may be configured to implement a standard interface, such as Serial-Attached SCSI (SAS), Fiber Channel interface, PCI Express (PCIe), SATA, USB, and the like. Host interface 505 may be configured to implement only one interface. Alternatively, host interface 505 (and/or the I/O interface of controller 501) may be configured to implement multiple interfaces, which may be individually selectable using a configuration parameter selected by a user or programmed at the time of assembly. Host interface 505 may include one or more buffers for buffering transmissions between host device 504 and controller 501.

Flash memory 503 represents a non-volatile memory device for storing data. According to aspects of the subject technology, flash memory 503 includes, for example, a NAND flash memory. Flash memory 503 may include a single flash memory device or chip, or, as depicted by FIG. 5, may include multiple flash memory devices or chips arranged in multiple channels. Flash memory 503 is not limited to any particular capacity or configuration. For example, the number of physical blocks, the number of physical pages per physical block, the number of sectors per physical page, and the size of the sectors may vary within the scope of the subject technology.

Flash memory may have a standard interface specification so that chips from multiple manufacturers can be used interchangeably (at least to a large degree). The interface hides the inner working of the flash and returns only internally detected bit values for data. In aspects, the interface of flash memory 503 is used to access one or more internal registers 506 and an internal flash controller 507 for communication by external devices. In some aspects, registers 506 may include address, command, and/or data registers, which internally retrieve and output the necessary data to and from a NAND memory cell array 508. For example, a data register may include data to be stored in memory array 508, or data after a fetch from memory array 508, and may also be used for temporary data storage and/or act like a buffer. An address register may store the memory address from which data will be fetched to host 504 or the address to which data will be sent and stored. In some aspects, a command register is included to control parity, interrupt control, and the like. In some aspects, internal flash controller 507 is accessible via a control register to control the general behavior of flash memory 503. Internal flash controller 507 and/or the control register may control the number of stop bits, word length, receiver clock source, and may also control switching the addressing mode, paging control, coprocessor control, and the like.

In some aspects, registers 506 may also include a test register. The test register may be accessed by specific addresses and/or data combinations provided at the interface of flash memory 503 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of flash memory 503 (e.g., read levels) to dynamically vary how data is read from the memory cells of memory arrays 508.

It should be understood that in all cases data may not always be the result of a command received from host 504 and/or returned to host 504. In some aspects, Controller 501 may be configured to execute a read operation independent of host 504 (e.g., to verify read levels or BER). The predicate words "configured to", "operable to", and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising: accessing a latency profile based on a determined device age of a solid state drive (SSD);
providing for display a user interface comprising a plurality of interface elements;
adjusting one or more of the plurality of interface elements to achieve one or more particular output performance characteristics of the SSD, wherein the user interface is configured based on the latency profile; and
sending an instruction to the SSD to configure the SSD with a control input parameter set based on the adjusted one or more of the plurality of interface elements,
wherein the one or more of the plurality of interface elements are different from the control input parameter set, and
wherein the one or more particular output performance characteristics are different from the control input parameter set.

2. The method of claim 1, wherein the plurality of interface elements are associated with a plurality of output performance categories of the SSD.

3. The method of claim 2, wherein the latency profile defines valid ranges for the plurality of output performance categories of the SSD, and wherein the one or more particular output performance characteristics are within one or more of the valid ranges.

4. The method of claim 1, wherein the one or more of the plurality of interface elements include a first interface element,
wherein the one or more particular output performance characteristics include a first particular output performance characteristic of the SSD, and
wherein when the first interface element is adjusted to achieve the first particular output performance characteristic of the SSD, a second interface element of the plurality of interface elements is automatically adjusted to achieve a second particular output performance characteristic of the SSD.

5. The method of claim 1, wherein the control input parameter set includes control input settings for controlling read operations, write operations, or erase operations on the SSD.

6. The method of claim 2, wherein the plurality of output performance categories of the SSD include a read latency and a read latency distribution.

7. A non-transitory machine-readable medium including machine-executable instructions thereon that, when executed by a processor, perform a method comprising:
accessing a latency profile based on a determined device age of a solid state drive (S SD);
providing for display a user interface comprising a plurality of interface elements;
adjusting one or more of the plurality of interface elements to achieve one or more particular output performance characteristics of the SSD, wherein the user interface is configured based on the latency profile; and
sending an instruction to the SSD to configure the SSD with a control input parameter set based on the adjusted one or more of the plurality of interface elements,
wherein the one or more of the plurality of interface elements are different from the control input parameter set, and
wherein the one or more particular output performance characteristics are different from the control input parameter set.

8. The non-transitory machine-readable medium of claim 7, wherein the plurality of interface elements are associated with a plurality of output performance categories of the SSD.

9. The non-transitory machine-readable medium of claim 8, wherein the latency profile defines valid ranges for the plurality of output performance categories of the SSD, and wherein the one or more particular output performance characteristics are within one or more of the valid ranges.

10. The non-transitory machine-readable medium of claim 7, wherein the one or more of the plurality of interface elements include a first interface element,
wherein the one or more particular output performance characteristics include a first particular output performance characteristic of the SSD, and
wherein when the first interface element is adjusted to achieve the first particular output performance characteristic of the SSD, a second interface element of the plurality of interface elements is automatically adjusted to achieve a second particular output performance characteristic of the SSD.

11. The non-transitory machine-readable medium of claim 7, wherein the control input parameter set includes control input settings for controlling read operations, write operations, or erase operations on the SSD.

12. The non-transitory machine-readable medium of claim 8, wherein the plurality of output performance categories of the SSD include a drive capacity, a read latency and a read latency distribution.

13. A system, comprising:
a processor;
a memory media having instructions stored thereon that, when executed by the processor, cause the processor to facilitate:
accessing a latency profile based on a determined device age of a solid state drive (SSD);
providing for display a user interface comprising a plurality of interface elements;
adjusting one or more of the plurality of interface elements to achieve one or more particular output performance characteristics of the SSD, wherein the user interface is configured based on the latency profile; and
sending an instruction to the SSD to configure the SSD with a control input parameter set based on the adjusted one or more of the plurality of interface elements,
wherein the one or more of the plurality of interface elements are different from the control input parameter set, and
wherein the one or more particular output performance characteristics are different from the control input parameter set.

14. The system of claim 13, wherein the plurality of interface elements are associated with a plurality of output performance categories of the SSD.

15. The system of claim 14, wherein the latency profile defines valid ranges for the plurality of output performance categories of the SSD, and wherein the one or more particular output performance characteristics are within one or more of the valid ranges.

16. The system of claim 13, wherein the one or more of the plurality of interface elements include a first interface element, wherein the one or more particular output performance characteristics include a first particular output performance characteristic of the SSD, and wherein when the first interface element is adjusted to achieve the first particular output performance characteristic of the SSD, a second interface element of the plurality of interface elements is automatically adjusted to achieve a second particular output performance characteristic of the SSD.

17. The system of claim 13, wherein the control input parameter set includes control input settings for controlling read operations, write operations, or erase operations on the SSD.

18. The system of claim 14, wherein the plurality of output performance categories of the SSD include a read latency and a read latency distribution.

19. A system, comprising:
means for accessing a latency profile based on a determined device age of a solid state drive (SSD);
means for providing for display a user interface comprising a plurality of interface elements;
means for adjusting one or more of the plurality of interface elements to achieve one or more particular output performance characteristics of the SSD, wherein the user interface is configured based on the latency profile: and
means for sending an instruction to the SSD to configure the SSD with a control input parameter set based on the adjusted one or more of the plurality of interface elements,
wherein the one or more of the plurality of interface elements are different from the control input parameter set, and
wherein the one or more particular output performance characteristics are different from the control input parameter set.

20. The system of claim 19, wherein the plurality of interface elements are associated with a plurality of output performance categories of the SSD, wherein the latency profile defines valid ranges for the plurality of output performance categories of the SSD, and wherein the one or more particular output performance characteristics are within one or more of the valid ranges.

21. The system of claim 19, wherein the control input parameter set includes control input settings for controlling read operations, write operations, or erase operations on the SSD.

22. The system of claim 19, wherein the plurality of interface elements are associated with a plurality of output performance categories of the SSD, and wherein the plurality of output performance categories of the SSD include a read latency and a read latency distribution.

23. A method, comprising:
adjusting one or more of a plurality of elements to achieve one or more particular output performance characteristics of a storage device, wherein the plurality of elements are associated with a plurality of output performance categories of the storage device; and
sending an instruction to the storage device to configure the storage device with one or more control input parameters based on the adjusted one or more of the plurality of elements,
wherein the one or more of the plurality of elements are different from the one or more control input parameters,
wherein the one or more particular output performance characteristics are different from the one or more control input parameters, and wherein the plurality of output performance categories are different from the one or more control input parameters.

24. The method of claim 23, wherein the one or more particular output performance characteristics are within one or more valid ranges of the plurality of output performance categories of the storage device.

25. The method of claim 23, wherein the one or more of the plurality of elements include a first element,
wherein the one or more particular output performance characteristics include a first particular output performance characteristic of the storage device, and
wherein when the first element is adjusted to achieve the first particular output performance characteristic of the storage device, a second element of the plurality of elements is automatically adjusted to achieve a second particular output performance characteristic of the storage device.

26. The method of claim 23, wherein the one or more control input parameters include control input settings for controlling read operations, write operations, or erase operations on the storage device, and wherein the plurality of output performance categories of the storage device include a read latency and a read latency distribution.

27. A system, comprising:
a memory; and
a controller configured to cause:
adjusting one or more of a plurality of elements to achieve one or more particular output performance characteristics of a storage device, wherein the plurality of elements are associated with a plurality of output performance categories of the storage device; and
sending an instruction to the storage device to configure the storage device with one or more control input parameters based on the adjusted one or more of the plurality of elements,
wherein the one or more of the plurality of elements are different from the one or more control input parameters,
wherein the one or more particular output performance characteristics are different from the one or more control input parameters, and
wherein the plurality of output performance categories are different from the one or more control input parameters.

28. The system of claim 27, wherein the one or more particular output performance characteristics are within one or more valid ranges of the plurality of output performance categories of the storage device.

29. The system of claim 27, wherein the one or more of the plurality of elements include a first element,
wherein the one or more particular output performance characteristics include a first particular output performance characteristic of the storage device, and
wherein when the first element is adjusted to achieve the first particular output performance characteristic of the storage device, a second element of the plurality of elements is automatically adjusted to achieve a second particular output performance characteristic of the storage device.

30. The system of claim 27, wherein the one or more control input parameters include control input settings for controlling read operations, write operations, or erase operations on the storage device, and
wherein the plurality of output performance categories of the storage device include a read latency and a read latency distribution.

31. The system of claim 27, wherein when a first element of the plurality of elements is adjusted to improve a performance characteristic of a first one of the plurality of output performance categories, a second element of the plurality of elements is automatically adjusted to reduce a performance characteristic of a second one of the plurality of output performance categories.

32. The system of claim 27, wherein the plurality of elements are adjustable according to performance priorities of the storage device.

\* \* \* \* \*